United States Patent

Sleegers

[11] Patent Number: 5,807,923
[45] Date of Patent: Sep. 15, 1998

[54] PROCESS OF EMULSION POLYMERIZATION

[75] Inventor: Mark Joannes Ludovicus Sleegers, Lint, Belgium

[73] Assignee: Imperial Chemical Industries PLC, United Kingdom

[21] Appl. No.: 596,332

[22] PCT Filed: Aug. 19, 1994

[86] PCT No.: PCT/GB94/01814

§ 371 Date: Jul. 16, 1996

§ 102(e) Date: Jul. 16, 1996

[87] PCT Pub. No.: WO95/06070

PCT Pub. Date: Mar. 2, 1995

[30] Foreign Application Priority Data

Aug. 23, 1993 [GB] United Kingdom ............ 9317478

[51] Int. Cl.$^6$ ...................................... C08K 5/06
[52] U.S. Cl. .................... 524/757; 524/457; 524/760; 524/804; 526/911; 252/356; 252/312
[58] Field of Search ............ 252/351, 356, 252/312; 524/457, 800, 804, 757, 760; 526/911; 560/198

[56] References Cited

U.S. PATENT DOCUMENTS

| | | | |
|---|---|---|---|
| 4,256,605 | 3/1981 | Baker | 252/312 |
| 4,263,413 | 4/1981 | Gardner et al. | 525/34 |
| 4,525,525 | 6/1985 | Hoefer et al. | 525/351 |
| 4,695,401 | 9/1987 | Sweeney | 252/312 |

FOREIGN PATENT DOCUMENTS

WO 94/00508  1/1994  WIPO.

*Primary Examiner*—Richard D. Lovering
*Assistant Examiner*—Daniel S. Metzmaier

[57] ABSTRACT

A process of oil-in-water emulsion polymerisation carried out in the presence of emulsifiers that are polyoxyethylene half ester of vic-dicarboxylic acids which give latices that are stable especially to coagulation by electrolytes, shear and/or freezing is disclosed. Particularly suitable emulsifiers are of the formulae (I) or (II):

$$Y.OOC.(HR)C.C(HR^1).COO.(AO)_n.R^2 \quad (I)$$

$$Y.OOC.(HR)C.C(HR^1).COO.(AO)_n.CO.(HR^1)C.C(HR)COO.Y \quad (II)$$

where: R, R$^1$, AO, n, R$^2$ and Y are as defined, in particular where the emulsifiers are polyoxyethylene half esters of alkenyl succinic acids.

7 Claims, No Drawings

PROCESS OF EMULSION POLYMERIZATION

This application is filed under 35 U.S. C. 371 based on PCT/GB94/01814, filed Aug. 19, 1994.

FIELD OF THE INVENTION

This invention relates to an oil-in-water emulsion polymerisation process carried out in the presence of a particular surfactants, especially vic-dicarboxylic acid polyalkyleneoxy half esters.

BACKGROUND OF THE INVENTION

PCT application No PCT/GB 93/01335 published as WO 94/000508 A, describes a class of derivatives, particularly esters, of vicinal dicarboxylic acids, particularly alkenyl or alkyl substituted succinic acids. Various uses of these are described, for example as emulsifying agents. We have now found a sub-class of the compounds described in the PCT Application are particularly useful as oil-in-water emulsifying agents in the polymerisation of ethylenic monomers.

SUMMARY OF THE INVENTION

Accordingly, the invention provides a process of oil-in-water emulsion polymerisation is characterised by the presence of at least one polyoxyethylene half ester of a vic-dicarboxylic acid.

More particularly, the invention provides a process of oil-in-water emulsion polymerisation in which the oil phase includes at least one ethylenically unsaturated monomer to be polymerised wherein the emulsion is stabilised by one or more compounds of the formula (I) or (II):

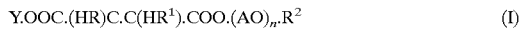
$$Y.OOC.(HR)C.C(HR^1).COO.(AO)_n.R^2 \quad (I)$$

where
one of R and $R^1$ is $C_8$ to $C_{22}$ alkenyl or alkyl and the other is hydrogen;
$(AO)_n$ represents a polyalkylene oxide chain of units AO, of the formula —$(C_mH_{2m}O)$— where m is 2 or 3 (and may vary along the chain), which includes ethylene oxide units and which may include up to 50 mole % of propylene oxide units;
n is 8 to 100 (and as it is an average it may be non-integral);
$R^2$ is hydrogen or $C_1$ to $C_6$ alkyl; and
Y is a cation forming group, particularly H, alkali metal especially sodium or potassium, or ammonium (especially $NH_4$, amine ammonium or alkanolamine ammonium); or

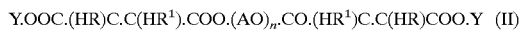
$$Y.OOC.(HR)C.C(HR^1).COO.(AO)_n.CO.(HR^1)C.C(HR)COO.Y \quad (II)$$

where:
n, AO each pair of R and $R^1$, and Y are independently as defined above for formula (I).

DETAILED DESCRIPTION OF THE INVENTION

In the formulae (I) and (II) above the following represent particularly useful materials as emulsifiers in the process of this invention.

The group R or $R^1$ which is not hydrogen alkenyl or alkyl is very desirably a $C_{12}$ to $C_{16}$ alkenyl or alkyl, especially alkenyl, group. When the group $R^2$ is $C_1$ to $C_6$ alkyl it is desirably a methyl, ethyl, propyl, or butyl group, particularly a methyl group. Y is a cation forming group i.e. a group that can ionise from the rest of the molecule to form a cation thus leaving the residue of the molecule anionic i.e. negatively charged. In particular, it is hydrogen, alkali metal, especially sodium or potassium, or ammonium, especially $NH_4$, amine ammonium or alkanolamine ammonium.

The alkylene oxide chain represented by $(AO)_n$ is of units AO of the formula —$(C_mH_{2m}O)$— where m is 2 or 3 (and may vary along the chain) includes ethylene oxide units and desirably is polyethylene oxide chain i.e. the group AO is —$(CH_2.CH_2O)$—. However, the chain may include a minor molar proportion of propylene oxide residues —$(C_3H_6O)$—. When the chain includes propylene oxide residues then these residues are desirably present as a block at the end of the alkylene oxide chain adjacent the carboxyl function. The number of alkylene oxide residues in the chain is from 8 to 100, particularly from 12 to 50, including polyethylene glycol (polyethylene oxide chains—PEG) chains equivalent to PEG 600 to PEG 2000.

Preferred emulsifiers used in this invention are generally as set out in our co-pending application, but the process especially employs such half esters containing anionic groups and/or groups ionisable to form an anion. Preferred emulsifiers used in the present invention contain anionically ionisable groups.

The polymerisation reaction mixture may include materials such as one or more other surfactants, such as alkyl phenol ethoxylates, alcohol ethoxylates and their sulphate or phosphate esters; alkyl and arallkyl sulphonates; alcohol sulphates; sulphosuccinate mono- and di-esters; alkylene oxide block copolymers, such as ethylene oxide propylene oxide copolymers; and end carboxylated ethoxylates (ether carboxylates); and/or protective colloids, such as water soluble cellulose ethers, e.g. carboxymethyl cellulose and hydroxyethyl cellulose; polyvinyl alcohol; and gums, such as xanthan and guar gums.

The oil-in-water emulsion polymerisation process of this invention can be carried out at pH values over a wide range, for example 3 to 11, particularly 4 to 10 especially 4 to 5 or 9 to 10.

The latex formed by the polymerisation is capable of high stability to electrolytes, shear and/or freezing, in particular against coagulation by such factors in uses where it is requires to resist coagulation.

The monomers (co)polymerisable in the process of this invention include acrylic species such as acrylate and (alpha alkyl) acrylate esters; acrylonitrile; and water insoluble (alpha alkyl) acrylamides, including cationic and quaternary species; vinylic species, such as vinyl chloride, vinyl esters, vinyl ethers, vinyl pyridines and styrenes; other olefinic species, such as ethylene, propylene, butadiene, isoprene, isobutadiene, and chloroprene; and vicinal dicarboxylic acids and their ethers anhydrides, amides and imides. Acryic monomers are particularly desirable as latices from acrylic monomers show particularly good freeze thaw stability when made by the process of this invention.

This list of monomers which are (co)polymerisable in the process includes species, such as isoprene, butadiene, isobutadiene, chloroprene, styrenes, and acrylonitrile and accordingly, the process of oil-in-water emulsion polymerisation according to this invention may be used in the production of emulsion rubber latices, including those of styrene butadiene rubbers (SBR), acrylonitrile butadiene rubbers (NBR), isoprene rubbers, isobutadiene rubbers and chloroprene rubbers.

The polymerisation catalyst in the process in general may be any conventional emulsion polymerisation catalyst compatible with the presence of the vic-dicarboxylic acid polyalkyleneoxy half ester, for example a peroxidic compound such as a persulphate.

The following Examples illustrate the invention. All parts and percentages are by weight unless otherwise stated.

Materials

Emulsifiers A to E are control emulsifiers included for comparison

A—Rhodapex CO 436 sulphated ethoxylated nonylphenol with an average of 4 moles ethylene oxide—ex Rhone Poulenc B—Rhodapex EP110 sulphated ethoxylated nonylphenol with an average of 9 moles ethylene oxide—ex Rhone Poulenc C—Atpol HM935 sulphosuccinate half ester surfactant ex ICI D—Atlas G-3300B ex ICI Emulsifiers A to D are commercially available materials, which contain anionically ionisable groups, used in emulsion polymerisation.

E—Synperonic NP13 —an ethoxylated nonyl phenol with an average of 13 moles ethylene oxide—ex ICI Emulsifiers F1 to F5 are materials used in this invention and are of the formula:

$$H.OOC.(HR)C.C(HR^1).COO.(CH_2.CH_2O)_n.H$$

where: one of R and $R^1$ is an alkenyl group (as given below) and the other is hydrogen and n is as given below

|  | $R/R^1$ | n (on average) |
|---|---|---|
| F1 | $C_{14}$ alkenyl | 13.6 |
| F2 | $C_{12}$ alkenyl | 13.6 |
| F3 | $C_{12}$ alkenyl | 9 |
| F4 | $C_{16}$ alkenyl | 13.6 |
| F5 | $C_{18}$ alkenyl | 22.6 |
| F6 | $C_{12}$ alkenyl | 16 |
| F7 | $C_{14}$ alkenyl | 22 |
| F8 | $C_{16}$ alkenyl | 12 |
| F9 | $C_{16}$ alkenyl | 16 |

Test methods

Viscosity (Visc.)

is Brookfield viscosity measured using spindle 4 at speed 2, results are quoted in mPas.

Particle Size (Size)

for Examples 1 and 3 was measured using a Malvern Zetasizer, and for Example 2 using a Malvern Mastersizer. The mean particle size is quoted in nm Electrolyte Stability (ES)

Equal quantities of polymer emulsion and 5% w/w calcium chloride solution were thoroughly mixed and then allowed to stand for 24 hours after which the stability was assessed.

Shear Stability (SS)

the latex was subject to shearing using a rotating Diaf dissolver disc at 50 Hz for 30 minutes. The latex was assessed one day and one week after the exposure to shear.

Freeze-thaw Stability (FTS)

A sample of neutralised latex was cooled to −20° C. over 1 hour held at this temperature for 11 hours, heated to +23° C. over 1 hour and held at this temperature for 11 hours. This cycle was repeated 5 times and the final result evaluated.

The results for Electrolyte Stability Shear Stability and Freeze-thaw Stability are based on the following assessment criteria:

good—no sign of individually visible particles fair—latex appearance retained, but visible particles formed fail—large flocs formed

EXAMPLE 1

The Oil-in-water emulsion polymerisation of butyl acrylate/methyl methacrylate/maleic anhydride (48.8:49.9:1.3 by weight).

A polymerisation reactor was charged with the following:

demineralised water 165.5 g sodium persulphate 0.5 g emulsifier 15 g

Monomer charge 51 g

The reactor was purged with nitrogen gas for 5 minutes and then heated to 85° C. and held at that temperature for 5 minutes. The following two streams were then fed to it simultaneously while holding the temperature at 85° C.:

a) over 2 hours monomer mixture 462 g b) over 2 hours 15 minutes a solution of
sodium persulphate 1.3 g
in demineralised water 46.7 g After the monomer addition was complete, the reaction mixture was held over another 2 h at 85° C. to ensure minimal residual monomer levels. The resulting latex was allowed to cool, neutralised with aqueous ammonia (as $NH_4OH$) to pH 9.4±0.2, then bottled for storage. Table 1 below shows a selection of properties of the latices produced.

EXAMPLE 2

The oil-in-water emulsion polymerisation of vinyl acetate/butyl acrylate (85:15 molar)

A polymerisation reactor was charged with the following:

demineralised water 403.75 g

Natrosol 250MR 2.75 g
(hydroxyethyl cellulose)

sodium bicarbonate 2.00 g sodium persulphate 0.5 g emulsifier 15.0 g

The reactor was purged for 20 minutes with nitrogen gas, heated to 75° C. and held at that temperature for 15 minutes. The following two streams were then fed to it simultaneously (as in Example 1), while holding the temperature at 75° C.

a) over 2 hours monomer mixture 462 g b) over 2 hours 15 minutes a solution of:
sodium persulphate 1.3 g
in demineralised water 46.7 g After the monomer addition was complete, the reaction mixture was held over another 2 h at 75° C. to ensure minimal residual monomer levels. The resulting latex was allowed to cool, then bottled for storage. Table 2 below shows a selection of the properties of the latices produced.

EXAMPLE 3

The oil-in-water polymerisation of butyl acrylate/methyl methacrylate-methacrylic acid (136.8:140:3.5 by weight) A butyl acrylate/methyl methacrylate/methacrylic acid latex was made at a nominal solids content of 38% by a seeded semi-continuous method. A polymerisation reactor was charged with the following:

demineralised water 417.1 g sodium persulphate 0.25 g emulsifier 6.9 g monomer charge 7.5 g Two feeds were made up with following composition:

monomer feed 272.6 g initiator feed sodium persulphate 0.5 g demineralised water 45.0 g The reactor charge and monomer feed were purged with nitrogen for 20 minutes. The reactor charge was then heated to 85° C. and held at this temperature for 5 minutes. The monomer feed and the initiator feed were then simultaneously added to the reactor charge in two streams; the monomer feed over 2 hours and the initiator feed for the 2 hours and a further 15 minutes. The reactor mixture was then held at 85° C. for a further 2 hours after which the latex was allowed to cool. The pH and particle size of this latex were measured on this acidic latex. The remainder of the latex was neutralised to pH 9.4±0.2 and was then bottled for storage. Further measurement of particle size and pH and the remaining tests were carried out on the neutralised latex. The results of the testing are set out in Table 3 below.

TABLE 1

| Emul. | Visc. (mPas) | pH | Size (nm) | ES | SS | FTS |
|---|---|---|---|---|---|---|
| A | <100 | 9.3 | — | fail | good | fail |
| B | <100 | 9.4 | 73 | fail | good | fail |
| C | <100 | 9.6 | 76 | fail | good | fail |
| D | — | — | — | — | — | — |
| E | 900 | 9.5 | 120 | good | fair | fail |
| F1 | <100 | 9.5 | 176 | good | good | good |
| F2 | <100 | 9.4 | 202 | good | good | good |
| F3 | — | 9.5 | 433 | good | good | good |
| F4 | — | 9.4 | 218 | good | good | good |
| F5 | — | 9.5 | 168 | good | good | good |

TABLE 2

| Emul. | Visc. (mPas) | pH | Size (nm) | ES | SS | FTS |
|---|---|---|---|---|---|---|
| A | 1000 | 4.5 | 620 | good | good | fail |
| B | 3200 | 4.6 | — | good | fair | fail |
| C | 100 | 5.3 | 1150 | good | good | fail |
| F1 | 5200 | 4.4 | 1310 | good | good | good |
| F2 | 1000 | 4.1 | — | good | — | — |
| F3 | 200 | 4.6 | 1880 | good | good | good |
| F4 | 1700 | 4.4 | 2270 | good | fair | good |
| F5 | 700 | 4.3 | 1110 | good | good | good |

TABLE 3

| Emuls. | Visc. (mPas) | pH + | pH − | Particle size (nm) + | Particle size (nm) − | ES | SS | FTS |
|---|---|---|---|---|---|---|---|---|
| A | <100 | — | 9.3 | — | — | fail | good | fail |
| B | <100 | — | 9.4 | — | 72.7 | fail | good | fail |
| E | <100 | 2.6 | 9.2 | 132.7 | 120.3 | fail | sed | fail |
| F1 | <100 | 2.4 | 9.2 | 185.7 | 189.2 | good | good | good |
| F2 | <100 | — | 9.4 | — | 201.9 | good | good | good |
| F4 | <100 | 2.3 | 9.2 | 165.0 | 218.2 | good | good | good |
| F5 | <100 | 2.3 | 9.2 | 164.0 | 167.8 | good | t.cr | good |
| F6 | <100 | 2.3 | 9.2 | 144.3 | 197.0 | good | good | good |
| F7 | <100 | 2.3 | 9.2 | 122.6 | 187.0 | good | sed | good |
| F8 | <100 | 2.4 | 9.2 | 162.5 | 208.4 | good | good | good |
| F9 | <100 | 2.3 | 9.2 | 123.1 | 173.3 | good | fair | good | notes to Table 3
+ measurement before neutralisation
− measurement after neutralisation
sed some sediment formed
t.cr slight creaming noted

I claim:

1. A process of oil-in-water emulsion polymerization in which the oil phase includes at least one ethylenically unsaturated monomer to be polymerized wherein the emulsion is stabilized by one or more compounds of the formula (I) or (II):

$$Y.OOC.(HR)C.C(HR^1).COO.(AO)_n.R^2 \quad (I)$$

where:

one of R and $R^1$ is $C_{12}$ to $C_{22}$ alkenyl or alkyl and the other is hydrogen;

$(AO)_n$ represents a polyalkylene oxide chain of units AO, of the formula —$(C_mH_{2m}O)$—, where m is 2 or 3 and may vary along the chain, which includes ethylene oxide units and which may include up to 50 mole % of propylene oxide units;

n is 8 to 100;

$R^2$ is hydrogen or $C_1$ to $C_8$ alkyl; and

Y is a cation forming group; or $$Y.OOC.(HR)C.C(HR^1).COO.(AO)_n.CO.(HR^1)C.C(HR).COO.Y \quad (II)$$

where:

one of R and $R^1$ is $C_{12}$ to $C_{22}$ alkenyl or alkyl and the other is hydrogen;

n, AO, and Y are independently as defined above for formula (I).

2. A process as claimed in claim 1 in which the group R or $R^1$ which is not hydrogen is a $C_{12}$ to $C_{16}$ alkenyl group; $R^2$ is hydrogen or a methyl, ethyl, propyl, or butyl group; Y is H, alkali metal, or ammonium; AO is —$CH_2.CH_2O$—; and n is from 12 to 50.

3. A process as claimed in either claim 1 or claim 2 which is the polymerization or copolymerization of one or more monomers selected from the group consisting of acrylic monomers, acrylate monomers, vinylic monomers, olefinic monomers, vicinal dicarboxylic acids and vicinal dicarboxylic acid anhydrides, amides and imides.

4. A process as claimed in claim 3 which is the polymerization or copolymerization of one or more olefinic monomers selected from the group consisting of ethylene, propylene, butadiene, isoprene, isobutadiene, chloroprene.

5. A process as claimed in claim 1 in which the polymerization reaction mixture further includes one or more other surfactants and/or protective colloids.

6. A process as claimed in claim 1 wherein Y is hydrogen, alkali metal, ammonium, amine ammonium, or an alkanolamine ammonium.

7. A process as claimed in claim 6 wherein the alkali metal is selected from the group consisting of sodium and potassium.

* * * * *